United States Patent [19]

Saternus et al.

[11] Patent Number: 4,618,376
[45] Date of Patent: Oct. 21, 1986

[54] METHOD OF PRODUCING A SUSPENSION OF FLY ASH IN WATER

[75] Inventors: Antoni Saternus, Tychy-Bieruń Stary; Ludwik Miczek, Pszczyna; Mieczysław Bartnik, Gliwice, all of Poland

[73] Assignees: Zaklady Produkcji Urzadzen Mechanicznych im. Janka Krasickiego "Elwo", Pszczyna; Biuro Studiow i Projektow Energetycznych "Energoprojekt", Katowice, both of Poland

[21] Appl. No.: 683,654

[22] Filed: Dec. 19, 1984

[30] Foreign Application Priority Data

Dec. 19, 1983 [PL] Poland ............................. 245199

[51] Int. Cl.⁴ .......................................... B01F 3/12
[52] U.S. Cl. ................................. 134/26; 106/117; 106/DIG. 1; 210/751; 366/2
[58] Field of Search ................ 106/85, 117, DIG. 1; 134/26; 210/747, 751, 170, 919; 366/2, 6

[56] References Cited

U.S. PATENT DOCUMENTS

| | | | |
|---|---|---|---|
| 3,328,180 | 6/1967 | Ban | 106/DIG. 1 |
| 3,859,799 | 1/1975 | Jaco, Jr. | 210/751 |
| 3,962,080 | 6/1976 | Dulin et al. | 210/751 |
| 4,121,945 | 10/1978 | Hurst et al. | 106/DIG. 1 |
| 4,313,762 | 2/1982 | Pound | 106/85 |
| 4,354,876 | 10/1982 | Webster | 106/85 |
| 4,472,198 | 9/1984 | Nowicki et al. | 106/DIG. 1 |

FOREIGN PATENT DOCUMENTS 60215 7/1970 Poland .

Primary Examiner—Peter Hruskoci
Attorney, Agent, or Firm—Ladas & Parry

[57] ABSTRACT

The subject of the invention is a method of continuous production of fly-ash in water of a suspension a high concentration of ash with the subsequent addition of slag or granular ash and an installation for the application of this method. The production process is divided into subsequent stages and is realized in separate zones of a flow mixer. Ash, slag, water and granular ash are fed in a continuous manner.

3 Claims, 1 Drawing Figure

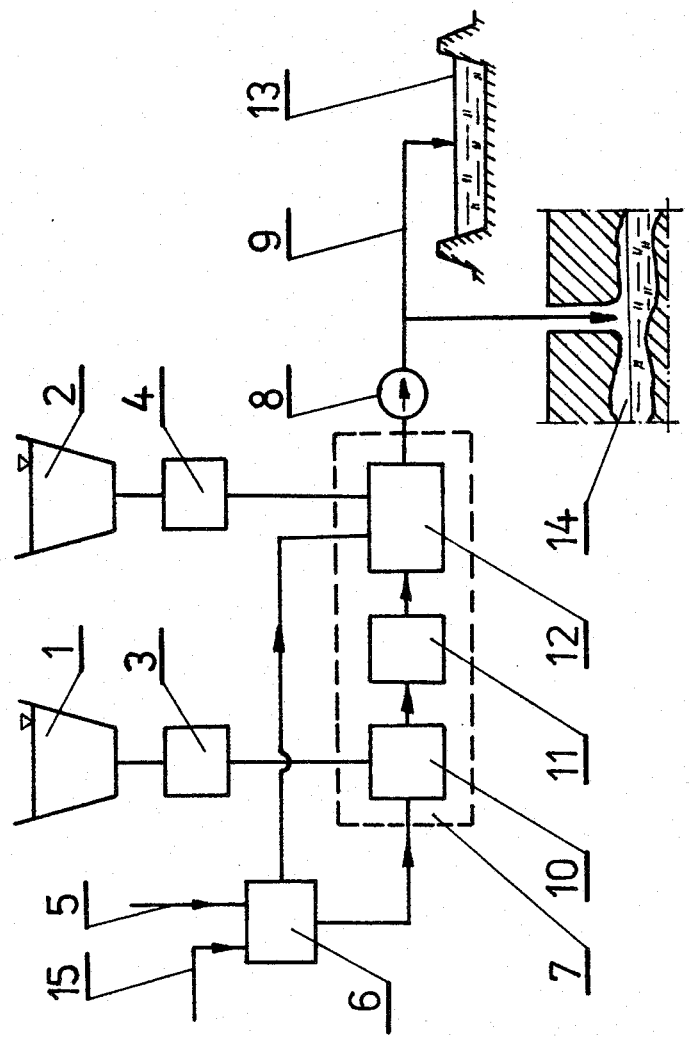

METHOD OF PRODUCING A SUSPENSION OF FLY ASH IN WATER

The subject of the invention is a method of continuous production of a suspension of fly-ash in water of a high ash concentration with the subsequent addition of the bottom ash and the installation for the application of this method.

The prior art methods of preparing an ash suspension comprise directing dry ash from under dust-collecting equipment to flushing apparatus of different types or to ejectors, which are supplied with water at the weight ratio of several times greater that of the ash weight. A large volume of water is required to reduce the surface tension of ash dust, to achieve full moisturization thereof and, thus, a suspension. Said suspension of a low concentration is sedimental because it does not have the characteristics of a heavy liquid. It is subsequently fed, along with a portion of slag, directly to drag pumps which force it through to the storage yard by pipelines. The hydrotransport apparatus conveying said suspension requires a large volume of water which is obtained by recycling the water from the storage yard by return pipelines.

The disadvantage has been addressed in application No. P-218778 which discloses a method of preparing a mixture with a high ash concentration. However, The process of preparing a the suspension according to the application is cyclic. Therefore, in order to achieve continuous operation of the hydrotransport installation, it is necessary to utilize at least two identical apparatus operating cyclically and alternately, as well as to install a storage reservoir of a relatively large capacity in which the turbulent state of the suspension is maintained by aeration. Moreover, the irregularity of loading the drives for mixing of single cycle results in the overload or underload of electric motors, hindering their efficiency and promoting their wear and, in consequence, abatement of the service reliability of the entire installation. The aeration process itself lowers the threshold of the starting of cavitation in the pump's flow system impacting negatively on the intermaintenance time of the pump.

The object of the present invention is to obtain a mixture of ash with water, having physical properties similar to those of heavy liquid, in a continuous manner which will make it possible to reduce the investment cost and to increase the longevity of the installation by the elimination of cyclical operation, to eliminate or decrease considerably retention of the elements of said installation, to improve the working conditions of pumps, and to compensate loads of drives, and the installation for realization of this method.

The subject of the invention is a method for the continuous production of an ash suspension in water with the subsequent addition of the bottom ash, and the installation for the application of this method. The present process is divided into subsequent stages and is carried out in the separate zones of a single flow device, a flow mixer. The first stage is the moisturization stage. At this stage, water is added to dry ash in the amount of up to 0.2 parts of water per 1 part of ash, and slow backfall mixing is carried out. A dense-plastic non-liquid moist ash mix of high heterogeneity is produced. Next, said mix passes to the second stage called the homogenization stage. At this stage further intensive non-turbulent mechanical mixing is carried out, providing for the homogenization of the ash mix. The mix is not fluidized since the amount of water thus fed is insufficient for surpassing the fluidization point. At this stage, apart from homogenization, slight dethickening of the mix occurs. In the third stage, the stage of fluidization and full discharge of the surface tension of dust, water is added in an amount necessary to transform the dense-plastic mix into a fluid state and to reach the desired concentration of 2.5 to 5.0 parts of ash per 1 part of water. The fluidized suspension is put into intensive turbulent circular motion, wherein ash is carried through areas of a increasing velocity gradients. The dust lumps are ground and the full electrostatic discharge on the dust grains' surface results. Additionally, the suspension acquires the physical properties of a heavy liquid. To accelerate the production of the suspension, water containing a high concentration of ions, such as saline mine water, the waste water from chemical water treatment or water with comprising other components undergoing electrolytic dissociation is utilized. During the stage, slag or granular ash is subsequently added, which can be fed together with the ash suspension via the same hydraulic draining system to the storage yard.

BRIEF DESCRIPTION OF THE DRAWING

The FIGURE is a diagram of ash suspension producing installation according to the present invention illustrating the systematic arrangement of ash and bunkers and continuous feeders, along with the flow mixer and its three separated zones, and external pipelines.

Referring now to the FIGURE, there is illustrated an ash bunker 1, a slag- or granular ash bunker 2, an ash continuous feeder 3, a slag- or granular ash continuous feeder 4, a system 5, a continuous water feeder 6 and a flow mixer 7, together with a drag pump 8 and external pipelines 9 which provide of hydraulic draining for the ash and slag or granular ash. The flow mixer comprises three separate zones: a moisturization zone 10, a homogenization zone 11 and a fluidization zone 12. To the continuous water feeder a pipeline 15 for transporting water containing dissociated components is connected. The installation according to the present invention carrys ash with slag or granular ash by external pipelines to a superficial storage yard 13 or an underground mine excavation 14.

Preparation of the ash suspension in this example is carried out as follows: Dry fly-ash from the bunker 1 is fed through the ash continuous feeder 3 to the moisturization zone 10 of the flow mixer 7. At the same time water from system 5 or saliferous water from pipeline 15 is fed through the continuous water feeder 6 to the moisturization zone. The ash is moistured and backfall-mixed, producing a dense-plastic non-fluid heterogenous wet mix of ash. The mix is then fed into the homogenization zone 11 where intensive non-turbulent mixing homogenizes the ash mix and slightly dethickens it. Next, the mix is fed into the fluidization stage zone 12 in which water is fed through the intermediary of the continuous water feeder in an amount necessary for the required concentration level. The suspension obtained is subjected to an intensive turbulent mixing such that as the mixture flows, the intensity of mixing increases. At this stage the mix surpasses the fluidity point, a suspension of the required concentration is obtained, and full discharge of the electrostatic tension on the surface of the dust grains takes place. In the fluidization zone, the suspension gains physical properties of a heavy liquid.

Slag or granular ash is fed into the zone through the intermediary of the continuous feeder 4. A ready suspension leaves the zone through the drag pump intermediary 8 and the external pipelines 9 and is delivered to the superficial storage yard 13 or the underground mine excavation 14.

We claim:

1. A method for the continuous producing of a suspension of fly-ash in water having a concentration of 0.5 to 2.5 parts ash to 1 part water in a flow mixer including a moisturization zone, a homogenization zone, and a fluidization zone, which steps comprise:

(a) adding 1 part fly ash to 0.2 parts water by weight to the moisturization zone and slowly mixing to produce an intermediate product comprising a dense plastic non-fluid substance;

(b) homogenizing and dethickening the intermediate product by intensive non-turbulent mixing in the homogenization zone; and (c) in the fluidization zone, adding water to obtain said concentration and turbulently mixing said intermediate product at increasing velocity gradients to electrostatically discharge said fly ash and form said suspension.

2. The method according to claim 1 wherein slag or granular ash is added to the suspension of fly-ash and water in the fluidization zone.

3. The method according to claim 2, wherein the water utilized is industrial waste water enriched with free ions.

* * * * *